Sept. 18, 1928.
A. H. GILKEY
ANIMAL TRAP
Filed Sept. 22, 1926
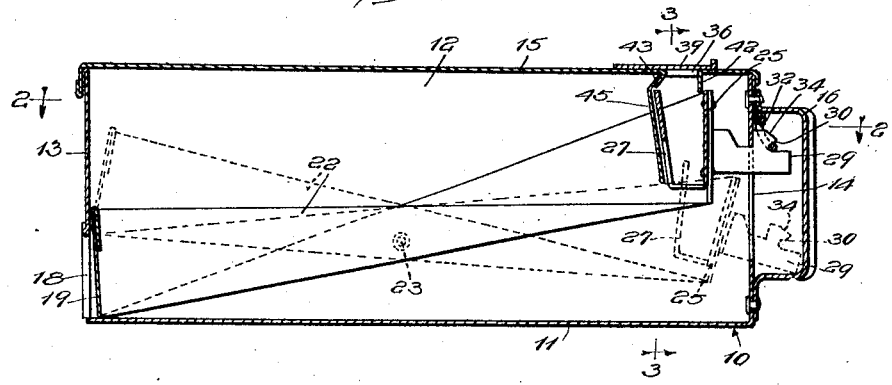
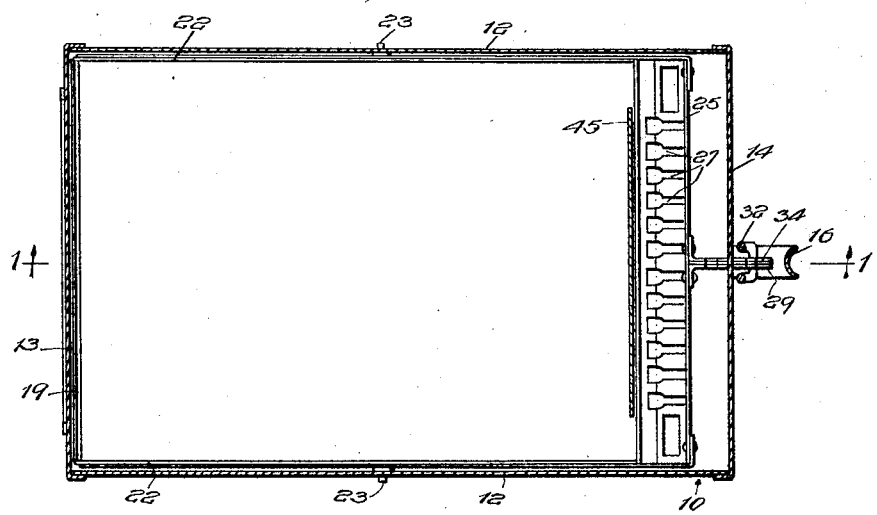
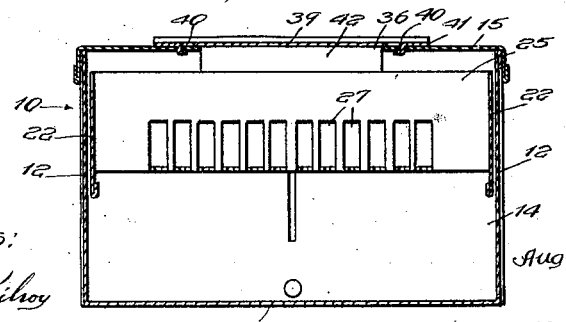

Patented Sept. 18, 1928.

1,684,484

UNITED STATES PATENT OFFICE.

AUGUSTINE H. GILKEY, OF CHICAGO, ILLINOIS.

ANIMAL TRAP.

Application filed September 22, 1926. Serial No. 137,009.

My invention relates to animal traps and has among its other objects the production of devices of the kind described which are compact, convenient, durable, efficient and satisfactory for use wherever found applicable.

A particular object of the invention is to provide an improved animal trap of simple and inexpensive construction.

A still further object of the invention is to provide improved devices of the kind described wherein several animals may be trapped at one time.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a vertical central section taken through an animal trap embodying the invention;

Fig. 2 is a section taken on line 2—2 of Fig. 1; and

Fig. 3 is a section taken on line 3—3 of Fig. 1.

Referring to the drawing, I have shown a preferred form of the invention embodied in an animal trap particularly adapted to be used for trapping rats and mice, but it is to be understood that I am limited to this use only to the extent indicated in the appended claims.

As shown in the drawing, the improved trap preferably comprises a cage or housing 10, which may be made of any suitable material, such as sheet metal, or the equivalent, the housing 10 preferably comprising a bottom wall 11, side walls 12 and end walls 13 and 14. The top of the housing 10 is preferably closed by a removable cover 15 and I preferably provide a handle 16 secured to the end wall 14 so that the trap may be readily carried from place to place.

In the end wall 13 I preferably provide an opening 18 through which the animals may enter the housing 10, the opening 18 being closed by a closure member or gate 19 when one or more animals have been trapped within the housing. The plate 19 is formed integral with or secured to a pair of levers 22 disposed adjacent and extending parallel to the side walls 12. As best shown in Figs. 1 and 2, the levers 22 are preferably provided with trunnions 23 intermediate their ends whereby they are pivotally mounted in the side walls 12.

Riveted, or otherwise secured to the levers 22, is a trough or receptacle 25 which is of less weight than the gate 19 so that the gate 19 will normally occupy the position wherein it is shown in full lines in Fig. 1. However, when the trap is to be used, sufficient bait is placed in the receptacle 25 to cause it to gravitate into the position wherein it is shown in dotted lines in Fig. 1 so that the plate 19 will uncover the opening 18. The receptacle 25 may be of any suitable design but I preferably provide it with a plurality of apertures 27 through which animals that have entered the trap may consume the bait.

Projecting from the receptacle 25 is a member 29 provided with a notch 30, which is engageable by a pivoted bail or latch member 32, the construction being such that when the receptacle 25 swings from its lowermost position to the position wherein it is shown in full lines in Fig. 1, the latch member 32 will ride up upon a cam surface 34 provided upon the member 29 and drop into the notch 30 to prevent the basket 25, the plate 19 and the levers 22 from returning to the positions wherein they are shown in dotted lines in Fig. 1.

The cover 15 is preferably provided with an aperture 36 through which bait may be placed in the receptacle 25 and through which the interior of the housing 10 may be viewed. The aperture 36 is preferably provided with a closure member 39 slidably secured to the cover by flanges 40 projecting from the closure member and arranged to engage slots 41 formed in the cover. The cover 15 is preferably provided with downwardly extending flanges 42 and 43 at the aperture 36 to prevent bait from falling out of the receptacle 25 when the receptacle occupies the position wherein it is shown in full lines in Fig. 1 and the trap is set on end or turned upside down. If desired, an apron or plate 45 may be secured to the flange 43 to function as a closure member for the apertures 27 when the receptacle is in its uppermost position. This is advantageous as it prevents the animals from consuming the remainder of the bait after they have eaten sufficient thereof to cause the receptacle and the plate 19 to move into the position wherein they are shown in full lines in Fig. 1.

The operation of the above described apparatus is substantially as follows: When the improved trap is to be used, sufficient bait is introduced into the receptacle 25 to cause it to gravitate into the position wherein it is shown in dotted lines in Fig. 1, the plate 19 being simultaneously displaced to uncover the opening 18. The bait may be introduced into the receptacle through the aperture 36 or the cover 15 may be removed, if it is so desired. When one or more animals enter the housing 10 through the aperture 18 and consume a sufficient amount of the bait, the plate 19 will overbalance the receptacle and the remainder of the bait and drop into the position wherein it closes the opening 18. The animals will then be trapped within the housing and may be disposed of in any preferred manner.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In an animal trap, the combination with an enclosure having an opening therein through which animals may enter the enclosure, of a closure members for said opening mounted to swing around a pivotal axis spaced from the opening, and bait holding means disposed on the other side of said pivotal axis and constrained to move with said closure means, said closure means being of sufficient weight to remain in its closed position when less than a predetermined weight of bait is held by the bait holding means.

2. In an animal trap, the combination with an enclosure having an opening therein through which animals may enter the trap, of a pivoted closure member for said opening, means for holding bait, means operatively connecting the closure member with said bait holding means whereby the closure member is caused to move into its closed position when less than a predetermined quantity of bait is held by said bait holding means, and means for locking the closure member in its closed position.

3. In an animal trap, the combination with an enclosure having an opening therein through which animals may enter the enclosure, of a closure member for said opening mounted to swing around a pivotal axis spaced from the opening, bait holding means disposed on the other side of said pivotal axis and constrained to move with said closure means, said closure means being of sufficient weight to remain in its closed position when less than a predetermined weight of bait is held by the bait holding means, and means for locking the closure member in its closed position.

4. In an animal trap, the combination with an enclosure having an opening therein through which animals may enter the enclosure, of a lever pivotally mounted intermediate its ends in the enclosure, a gate carried at one end of the lever for closing said opening, and bait holding means carried at the other end of said lever, said gate being heavier than said bait holding means to remain in a position wherein it closes said opening when the bait holding means is empty.

5. In an animal trap, the combination with an enclosure having an opening therein through which animals may enter the enclosure, of a lever pivotally mounted intermediate its ends in the enclosure, a gate carried at one end of the lever for closing said opening, bait holding means carried at the other end of said lever, said gate being heavier than said bait holding means to remain in a position wherein it closes said opening when the bait holding means is empty, and means for locking said gate in its closed position.

6. In an animal trap, the combination with an enclosure having an opening therein through which animals may enter the enclosure, of a lever pivotally mounted intermediate its ends in the enclosure, a gate carried at one end of the lever for closing said opening, bait holding means carried at the other end of said lever, said gate being heavier than said bait holding means to remain in a position wherein it closes said opening when the bait holding means is empty, means for locking said gate in its closed position, and means for retaining bait in the bait holding means when the trap is inverted.

7. In an animal trap, the combination with an enclosure having an opening therein through which animals may enter the enclosure, of a lever pivotally mounted intermediate its ends in the enclosure, a gate carried at one end of the lever for closing said opening, bait holding means carried at the other end of said lever, said gate being heavier than said bait holding means to remain in a position wherein it closes said opening when the bait holding means is empty, means for locking said gate in its closed position, and means for preventing animals in the trap from eating the bait when the closure member is in its closed position.

8. In an animal trap, a housing having an aperture in one end and in the top, a pivoted lever in the housing, closure member at one end of the lever, normally closing the aperture in the end of the housing, a bait receptacle at the other end of the lever normally positioned beneath the aperture in the top and means for locking the closure member and receptacle in normal position.

9. A trap of the class described including a housing, a pivotally mounted bait receptacle therein, and means for locking said receptacle against movement to prevent displacement of movable contents therein regardless of the position of the housing.

10. A trap including a housing having an aperture in the top wall thereof, flanges depending from the sides of said aperture, a pivotally mounted bait receptacle inoperatively positioned beneath said aperture, a plate depending from one of said flanges at one side of the receptacle and means for locking said receptacle in its inoperative position.

In testimony whereof, I have hereunto signed my name.

AUGUSTINE H. GILKEY.